Feb. 21, 1967  A. P. GREENWOOD  3,304,900
AIRCRAFT FLOAT
Filed Dec. 1, 1965  2 Sheets-Sheet 1
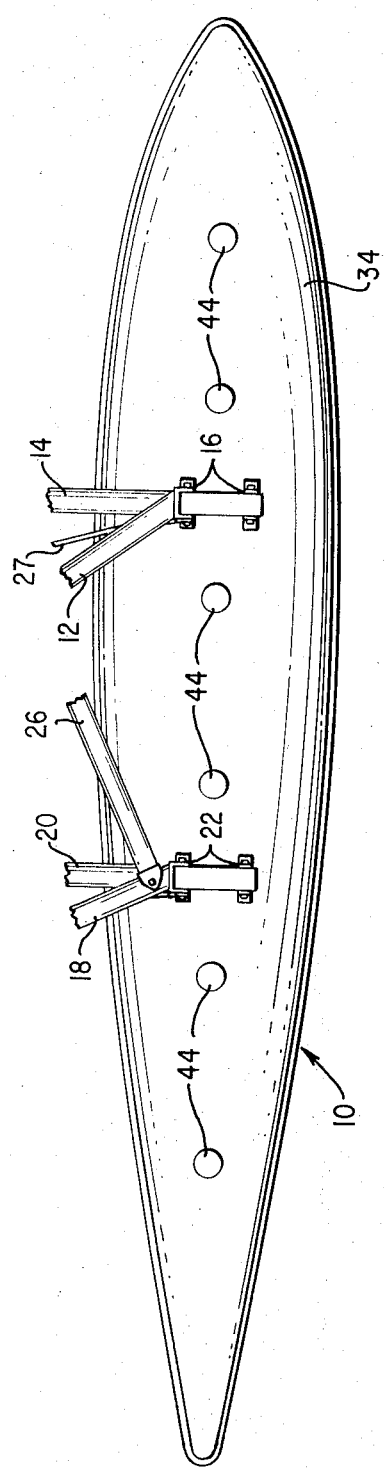
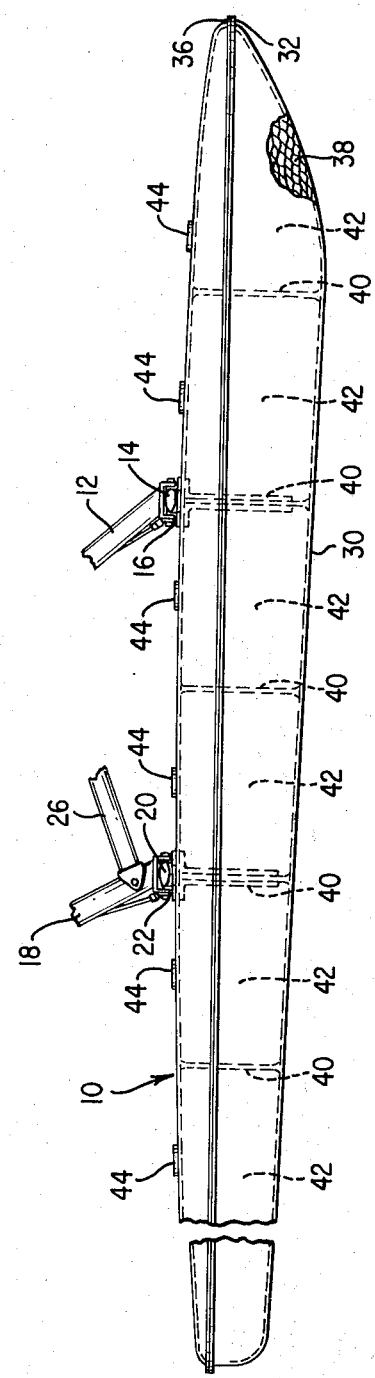
INVENTOR.
ALFRED P. GREENWOOD
BY
ATTORNEYS

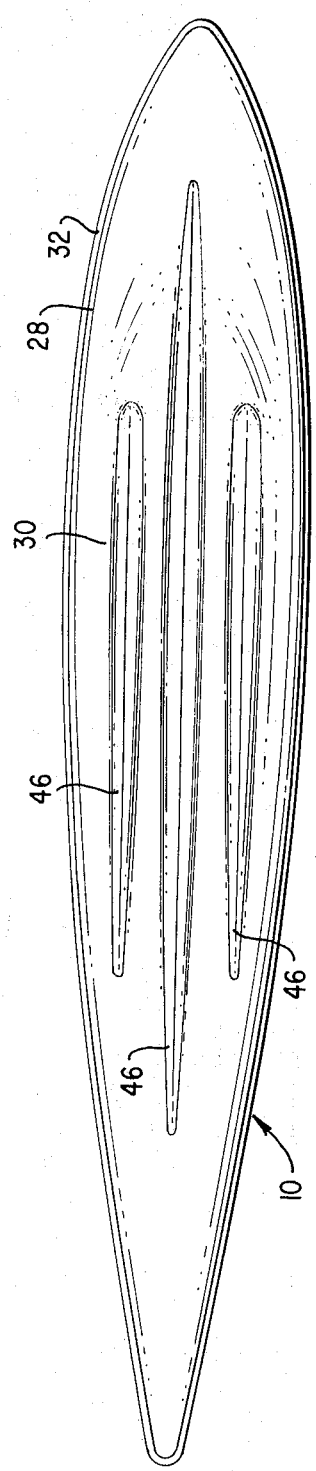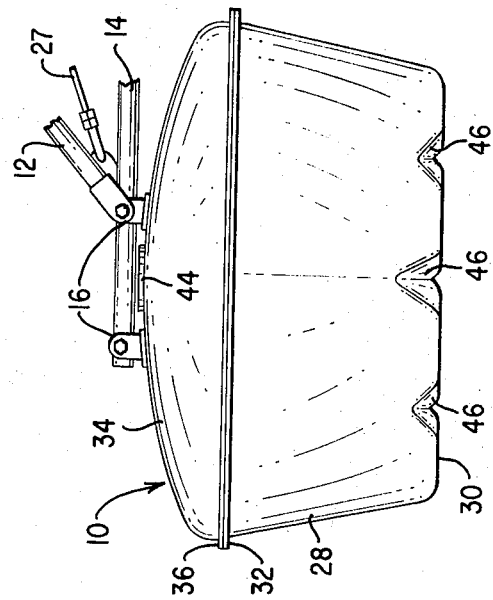

United States Patent Office 3,304,900
Patented Feb. 21, 1967

3,304,900
AIRCRAFT FLOAT
Alfred P. Greenwood, Manitou Beach, Mich. 49253
Filed Dec. 1, 1965, Ser. No. 510,900
4 Claims. (Cl. 114—66.5)

The present invention relates to a float and more particularly to a float for aircraft.

Among the problems attendant to aircraft of the type designed for landing and taking off from water, is the load imposed on the floats or pontoon structures during the take-off of the aircraft. Typically, on takeoff at the time the aircraft is preparing to become airborne, there is a considerable load imposed on the aircraft by the tendency of the water to, in effect, adhere to the bottom surface of the floats or pontoons.

It is a principal object of this invention to produce a float or pontoon for aircraft incorporating a structure which will tend to break or substantially reduce the adherence between the bottom surface of the float and the water.

Another object of the invention is to produce a float or pontoon for aircraft which is light in weight and rugged in construction.

Still another object of the invention is to produce an aircraft float which may be readily attached to the fuselage of conventional aircraft.

A further object of the invention is to produce an aircraft float having a double walled honeycomb construction.

Still a further object of the invention is to produce an aircraft float the interior of which is subdivided into a plurality of individual water-tight compartments.

The above objects and advantages of the invention may be achieved by an aircraft float structure comprising an elongate float, the interior of which is divided into a plurality of separate water-tight compartments, and the bottom of which contains at least two parallel spaced apart air guiding channels extending for and aft of the float, the channels being an inverted V-shape in cross section, and tapering to a substantially flat surface at the aft portion of the float.

Other objects and advantages of the invention will be apparent from reading the following detailed description of an embodiment of the invention when considered in the light of the accompanying drawings, in which:

FIGURE 1 is a top plan view of an aircraft float embodying the structural concepts of the invention;

FIGURE 2 is a side elevation of the float structure illustrated in FIGURE 1;

FIGURE 3 is a bottom plan view of the float structure illustrated in FIGURES 1 and 2; and FIGURE 4 is a front view of the apparatus illustrated in FIGURES 1, 2, and 3.

Referring to the drawings, there is shown one of a pair of floats for supporting an aircraft in water. The float is generally designated by the reference numeral 10 and is typically affixed to an associated aircraft fuselage by a front strut 12 and a rearwardly spaced rear strut 18. The float 10 and the other spaced apart float (not shown) are maintained in a fixed space relation by front and rear spreader bars 14 and 20, respectively. The terminal portion of the spreader bars 14 and 20 are secured to the upper surface of float 10 by suitable attaching brackets 16 and 22, respectively. Manifestly, the opposite ends of the spreader bars 14 and 20 are similarly secured to the upper surface of the other float, not shown.

A drag strut 26 is connected between the front and rear struts 12 and 18 to introduce greater stability in the overall system. Further, and to increase the strength and stability of the system, a tie rod 27 is shown as having one end coupled to one of the brackets 16 while the other end, not shown, is conveniently connected to the aircraft fuselage at the same point where the opposite strut member is attached. A similar tie rod may be employed in connection with the rear strut assembly.

The center of gravity of the float illustrated in the drawings is located slightly aft of the front bracket 16. The float is designed so that the maximum buoyancy is forward of the center of gravity thereby imparting proper floating characteristics to the floats, particularly when the associated aircraft is mounted so that its center of gravity is aft of the maximum buoyancy of the floats.

The float 10 is formed of a bottom section 28 and a cooperating top section 34. The bottom section is preferably hollow in form and has a substantially flat bottom extending from the forward end to the rearmost end thereof. At the upper edge portion of the bottom section 28, there is an integral outwardly extending flange 32 which provides a sealing area with a corresponding outwardly extending flange 36 of the top section 34. In assembling the bottom and top sections during the manufacture of the float, the flanges 32 and 36 are placed in superposed relation and suitably adhesively secured together.

The bottom and top sections of the float 10 are preferably formed of a light weight strong matrix comprised of a pair of spaced apart fiber glass reinforced plastic material layers with a central honeycomb core structure 38 illustrated by the cut-away section of FIGURE 2. The matrix is suitably molded in appropriately shaped molds and during the molding operation vertically extending bulkheads 40 are inserted into the interior of the bottom and top sections and caused to become an integral part of the overall structure. The bulkheads 40 cooperate to form water-tight compartments 42 between adjacent bulkheads. It has been found that satisfactory results have been obtained by forming the layer of the matrix of polyester resin with a honeycomb core structure 38 of kraft paper. Preferably the kraft paper is impregnated with a phenolic resin to impart greater strength and water resistant characteristics thereto.

A plurality of inspection holes are formed in the top section 34 to provide inspection access for the individual compartments 42 and each of the inspection holes is provided with an inspection hole cover 44. Manifestly, the inspection hole cover 44 are in water-tight sealing relationship with the edges of their respective holes to militate against the passage of water therethrough.

The substantially flat bottom surface 30 of the bottom section 28 of the float is formed with a plurality of air guiding channels 46, which typically extend from the front or bow portion thereof toward the aft portion in substantially parallel spaced relation. In this instance, three channels 46 are employed, the two outer ones being shorter and of equal length and the center one being considerably longer than the outer ones and extending beyond the opposite ends thereof. Although three channels are preferred, the number may be varied.

The air guiding channels 46 function, during takeoff of the associated aircraft, to accelerate the release of the water that tends to adhere to the bottom surface of the float and thereby more quickly remove the load on the aircraft on takeoff. More specifically, it is believed that as the aircraft moves through the water on takeoff, the channels 46 capture or entrap air which is driven rearwardly and is in effect compressed during its rearward movement, and finally is expelled from the reduced cross-sectional area at the aft terminus of the channels. The relatively high pressure air being released at the rearward or aft end of the channels 46 tends to fan out laterally adjacent the uninterrupted rear bottom surface of the float, thus forcing the water therefrom. Thus on the takeoff of the aircraft, the normal load imposed on the floats by the water is quickly released by the high pressure air streaming through the converging channels 46.

It will be noted that the aft end of the air guiding channels 46 terminates forward of the aft end of the flat bottom 30 of the float. This termination point is necessary to cause the phenomenon explained above to occur.

In accordance with the provisions of the patent statutes, I have explained the principle and mode of operation of my invention and have illustrated and described what I now consider to represent its best embodiment. However, I desire to have it understood that, within the scope of the appended claims, the invention may be practiced otherwise than is specifically illustrated and described.

What I claim is:

1. An aircraft float structure comprising:
   a main elongate body portion havin a forward and an aft end, said body having an upper section and a mating lower section cooperating to form a hollow interior, said lower section having a substantially flat bottom water engaging surface;
   a plurality of bulkheads disposed in spaced relation from the forward to the aft end within the hollow interior of said body portion, thereby forming a plurality of water tight compartments;
   a plurality of air guiding channels formed in the bottom surface of the lower section of said body portion, said air guiding channels extending in parallel spaced relation with the longitudinal axis of said body portion, said air guiding channels being generally inverted V-shaped in cross-section and decreasing in cross-sectional area from the forward end to the aft end of said body portion, said air guiding channels terminating forward of the aft end of the flat bottom surface of said body portion; and
   means for attaching the upper section of said body portion to an associated aircraft.

2. An aircraft float structure as defined in claim 1 including a plurality of bulkheads disposed in spaced relation from the forward to the aft end within the hollow interior of said body portion, thereby forming a plurality of water tight compartments.

3. An aircraft float structure as defined in claim 1 wherein said body portion is formed of a double wall honeycomb core structure.

4. An aircraft float structure as defined in claim 3 wherein said double wall honeycomb core structure comprises a pair of spaced apart layers of a thermosetting resin having an interdigitated honeycomb layer therebetween.

No references cited.

MILTON BUCHLER, *Primary Examiner.*

A. H. FARRELL, *Assistant Examiner.*